(No Model.)

J. AUBLE & A. D. WEISS.
LAWN SPRAYER.

No. 558,891. Patented Apr. 21, 1896.

Witnesses
Inventors
John Auble
Arkless D. Weiss
Attorneys

UNITED STATES PATENT OFFICE.

JOHN AUBLE AND ARKLESS D. WEISS, OF WILKES-BARRÉ, PENNSYLVANIA, ASSIGNORS TO RALPH W. LEE AND JAMES A. WATSON, OF WASHINGTON, DISTRICT OF COLUMBIA.

LAWN-SPRAYER.

SPECIFICATION forming part of Letters Patent No. 558,891, dated April 21, 1896.

Application filed April 30, 1894. Serial No. 509,494. (No model.)

*To all whom it may concern:*

Be it known that we, JOHN AUBLE and ARKLESS D. WEISS, citizens of the United States, residing at Wilkes-Barré, in the county of Luzerne and State of Pennsylvania, have invented certain new and useful Improvements in Lawn-Sprayers, of which the following is a specification.

Our invention relates to lawn-sprinklers; and it consists in a novel device for distributing water in the form of spray upon lawns or gardens, and generally for spraying or spreading liquids for any purpose.

Figure 1:
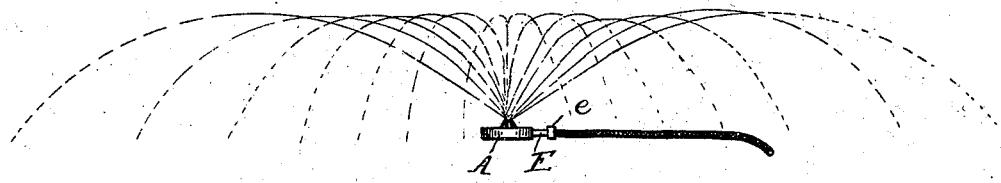
Figure 2:
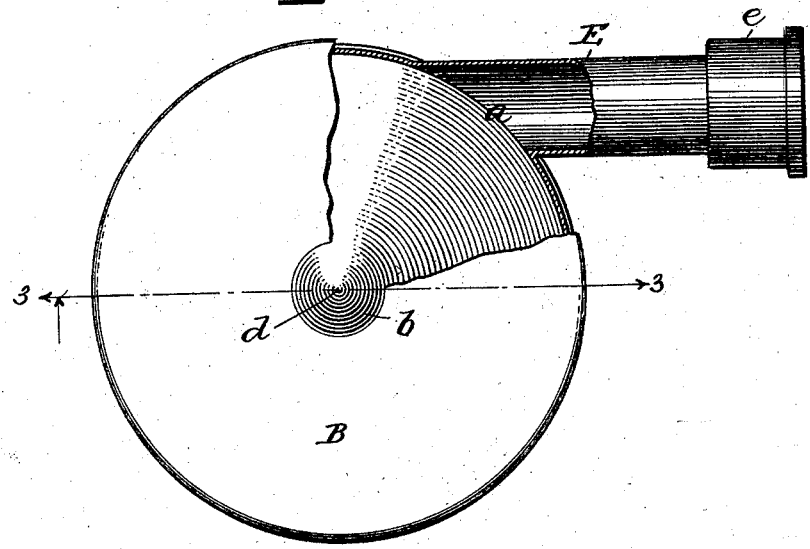
Figure 3:
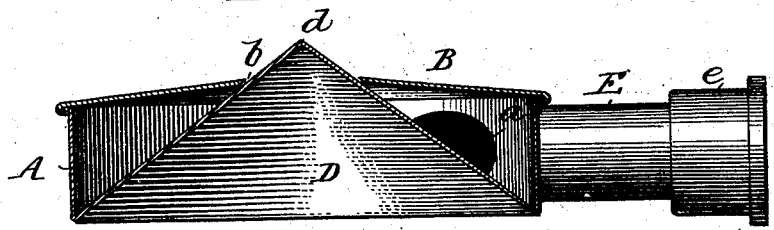
Figure 4:
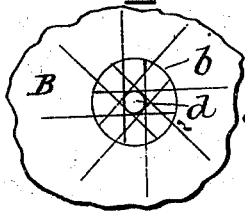

In the accompanying drawings, which form a part of this specification, Figure 1 shows the sprayer in operation. Fig. 2 is a plan view, part of the top being broken away to show the interior. Fig. 3 is a section on the line 3 3 of Fig. 2, and Fig. 4 is a diagram showing the mode of operation of our invention.

Our sprayer consists, preferably, of a circular casing, having an annular side wall A, with a tangential opening $a$ therein, a circular substantially flat top plate B, having a central circular opening $b$, and a cone-shaped bottom plate D, having its base attached to the lower edge of the side wall A and its apex $d$ protruding through the opening $b$ in the top and partially or nearly filling said opening. A tangential tube E may be attached to the casing in line with the opening $a$ and provided with a hose-coupling $e$.

The operation of our invention is as follows: Water under pressure being admitted through the opening $a$ into the annular chamber surrounding the cone it circulates with increasing rapidity toward the central discharge-opening $b$. If the cone were removed, this water would tend to fly off horizontally and tangentially from the opening $b$. With the cone present, as shown in the drawings, the water would all be projected toward its apex if there were no rotary movement in the casing. The real action of the water is in the direction of the resultant of these two forces—that is, the cone gives it an upward direction and the rotation spreads it horizontally, thus producing the effect shown in Fig. 1. The substantially flat top plate directs the water against the surface of the cone as it issues from the orifice. The volume of water and the extent of space covered will depend upon the pressure and the width of the annular opening from which the water issues.

The sprayer is preferably made of sheet metal, stamped into shape and united by suitable joints. It may, if desired, be made of cast metal. It will be evident that the spraying effect is produced by the cone projecting through the top, with an annular opening between. The cone might be separate from the bottom and either hollow or solid, and the top might be convex or concave without destroying the effect of the combination, although these forms are not desirable. We therefore do not care to limit ourselves to the precise construction and arrangement of parts shown and described.

What we claim is—

1. In a lawn-sprinkler, a casing having an annular wall, a closed bottom, a substantially flat top plate having a central circular opening, a cone-shaped body within the circular wall of the casing and having its apex projecting above and nearly filling said circular opening, and an opening in the circular wall arranged to admit water tangentially to the annular chamber surrounding the cone, substantially as described.

2. A lawn-sprinkler consisting of a casing having an annular wall with a tangential opening therein, a substantially flat top plate having a central circular opening, and a cone-shaped bottom plate arranged with the apex of the cone protruding from and nearly filling the circular opening of the top plate, substantially as described.

In testimony whereof we affix our signatures in presence of two witnesses.

JOHN AUBLE.
ARKLESS D. WEISS.

Witnesses:
W. L. RAEDER,
B. B. WINCHESTER.